United States Patent [19]

Malvern

[11] Patent Number: 5,448,353
[45] Date of Patent: Sep. 5, 1995

[54] RING RESONATOR GYROSCOPE WITH REDUCED BACKSCATTER EFFECT

[75] Inventor: Alan R. Malvern, Plymouth, Great Britain

[73] Assignee: British Aerospace PLC, London, England

[21] Appl. No.: 860,760

[22] Filed: Mar. 31, 1992

[30] Foreign Application Priority Data

Apr. 5, 1991 [GB] United Kingdom ............. 9107125

[51] Int. Cl.[6] .............................. G01C 19/72
[52] U.S. Cl. .................................... 356/350
[58] Field of Search ........................ 356/350

[56] References Cited

U.S. PATENT DOCUMENTS

| | | | |
|---|---|---|---|
| 4,815,321 | 3/1989 | Malvern | 356/350 |
| 4,820,008 | 4/1989 | Malvern | 356/350 |
| 4,825,261 | 4/1989 | Schroeder | 356/350 |
| 5,009,505 | 4/1991 | Malvern | 356/350 |
| 5,018,858 | 5/1991 | Malvern | 356/350 |
| 5,090,810 | 2/1992 | Malvern | 356/350 |
| 5,141,315 | 8/1992 | Malvern | 356/350 |

FOREIGN PATENT DOCUMENTS 62-2121 1/1987 Japan ........................ 356/350

*Primary Examiner*—Samuel A. Turner
*Attorney, Agent, or Firm*—Cushman, Darby & Cushman

[57] ABSTRACT

A ring resonator gyroscope has clockwise and counter-clockwise light beams that are frequency shifted by an equal but opposite amount and then have their frequencies varied in antiphase relative to each other about a mean frequency ($f_o + f_1$ or $f_o - f_1$) so any backscatter signal is at the difference frequency and locking at zero rate thus is avoided.

13 Claims, 7 Drawing Sheets

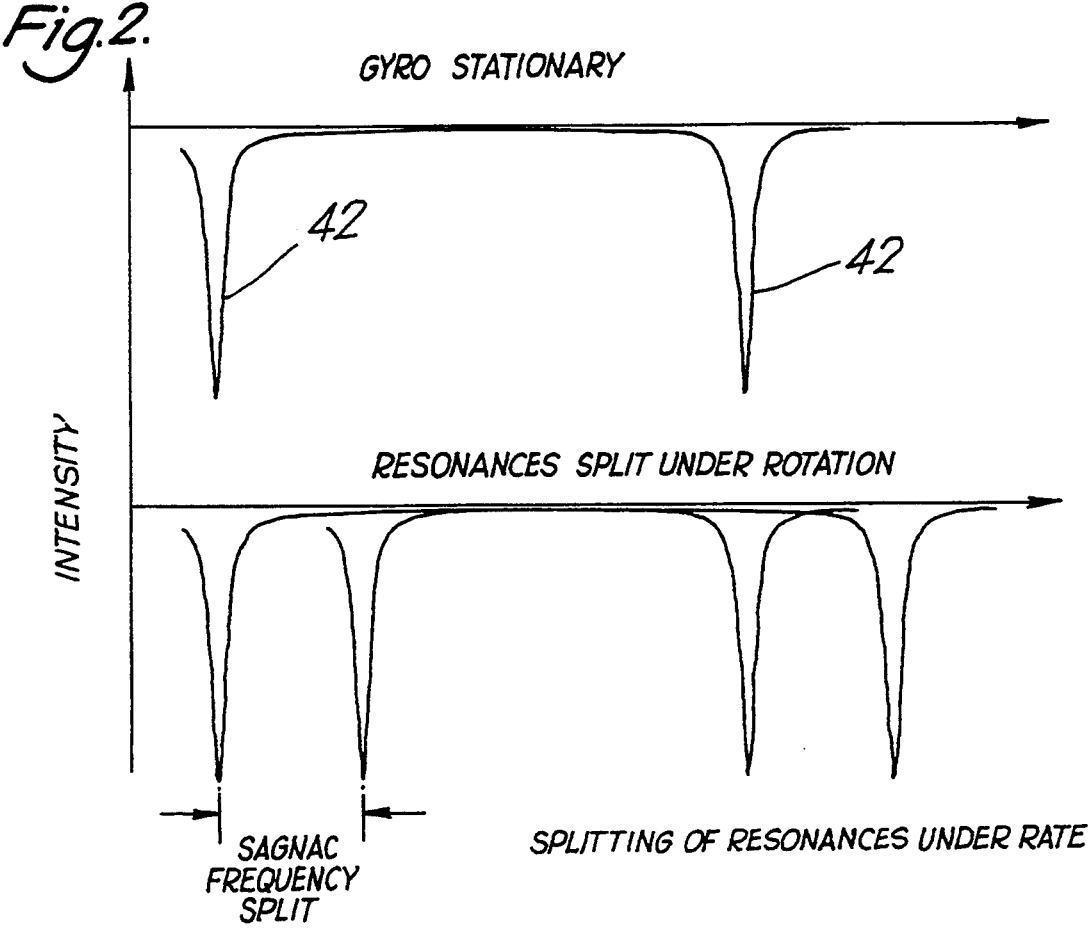
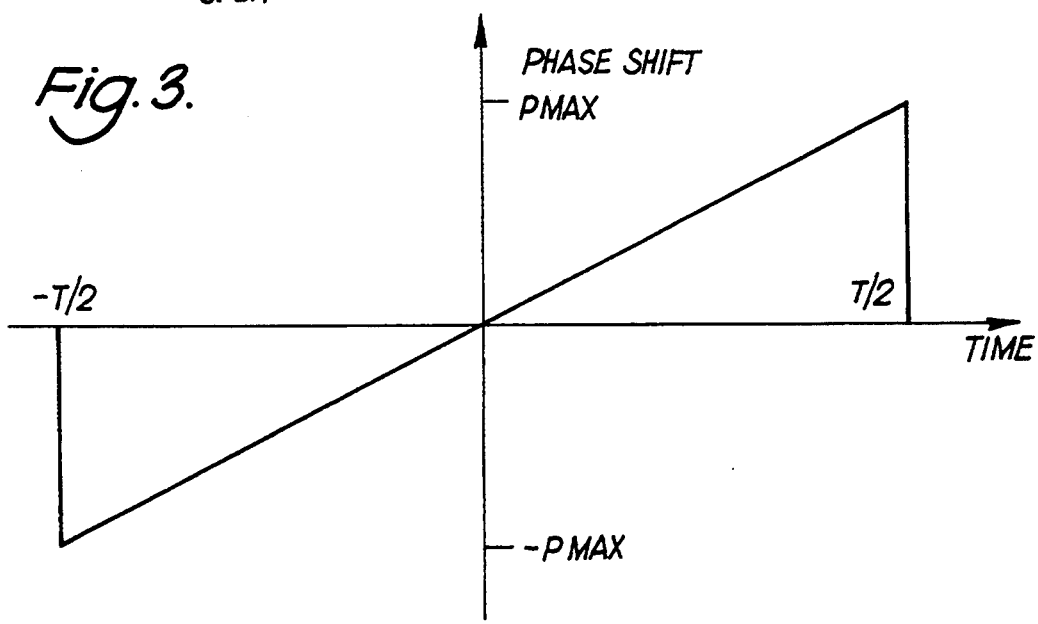
PERFECT SERRODYNE WITH P MAX = PI
IDEAL SERRODYNE MODULATION

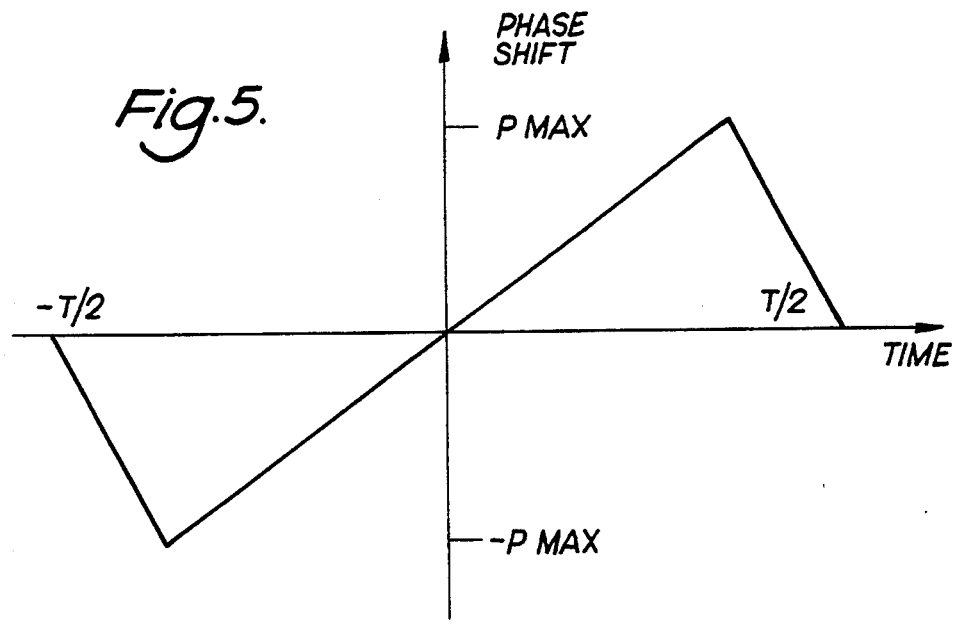
IMPERFECT SERRODYNE WITH P MAX NOT = PI
FIGURE 2·4 IDEAL SERRODYNE MODULATION
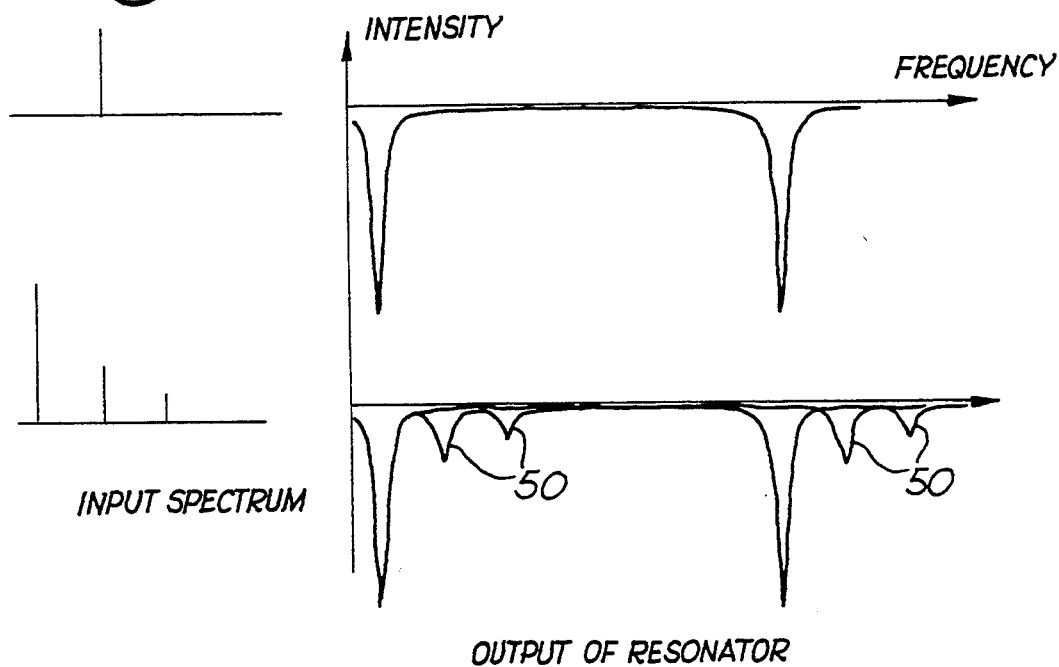
RESPONSE OF RESONATOR WITH SIDEBANDS

RING RESONATOR GYROSCOPE WITH REDUCED BACKSCATTER EFFECT

BACKGROUND OF THE INVENTION

1. Field of the Invention

The present invention relates to a ring resonator gyroscope and relates particularly, but not exclusively, to a ring resonator gyroscope having a means for reducing the disruptive effect of any back scatter signal.

2. Description of the Related Art

Presently known ring resonator gyroscopes comprise a laser for producing laser light at a first frequency, light splitting means in the form, for example, of integrated optics for splitting said light into first and second light components and a ring resonator in the form of a fibre optic bundle for receiving said first light component in a first direction therearound and the second light component in a second direction therearound. Phase modulators act to apply a positive frequency shift to the first light component and a negative frequency shift of equal magnitude to the second light component in order to maintain both light components on resonance at the same time. Photo detectors act to detect the first and second light components after passing around the resonator and act to detect changes in the interference patterns which are then electronically interpreted to indicate the direction and inertial rate of rotation of the gyroscope about the gyro's sensitive axis.

SUMMARY OF THE INVENTION

One of the problems associated with the above mentioned arrangement is its susceptibility to backscatter effects which result in inaccurate rate readings.

It is an object of the present invention to provide a ring resonator gyroscope which reduces and possibly eliminates the problems of backscatter effects on the accuracy of rate readings and avoids lockin at zero rate.

Accordingly, the present invention provides a ring resonator gyroscope comprising a laser for producing laser light at a first frequency, light splitting means for splitting said light into first and second light components, a ring resonator for receiving said first light component in a first direction therearound and for receiving said second light component in a second direction therearound, frequency shifting means for applying a positive frequency shift to said first light component and a negative frequency shift of equal magnitude to said second light component such that both light components are on resonance at the same time, resonance locking means for maintaining said first light component on resonance, beam detecting means for detecting said first and second light components after passing around the resonator and frequency varying means for varying the frequency of the shifted first and second light components at a frequency ($W_m$) in antiphase to each other about a mean reference frequency ($f_o + f_1$ or $f_o - f_1$).

It will be appreciated that there is a varying difference frequency between the light in the two directions around the resonator. This means that any backscatter signal is at this difference frequency which is large compared to the 10 KHz frequency used for demodulation. The gyro servos will therefore not be disrupted by the effects of backscatter so there will be no locking at zero rate and the scale factor of the gyro will be linear.

Preferably, the frequency varying means is operable to vary the frequency of the shifted first and second light components sinusoidally about said mean reference frequency.

Advantageously, the same magnitude of frequency shift is applied to the first and second light components thereby to benefit from common made rejection between the path length loop and the frequency loop.

Advantageously, the gyroscope is provided with error signal generating means for monitoring the frequency variation of said first or second light components at said photodetector and for generating an error signal for driving servos to lock both light components to line centre.

Conveniently, the gyroscope includes path length changing means for changing the path length of the ring resonator so as to facilitate locking onto resonance.

Alternatively, the gyroscope may include laser frequency varying means for varying the frequency of the laser light so as to facilitate locking onto resonance.

Preferably, the frequency of the laser-light as produced by the laser is substantially 1 MHz, thereby to ensure any spurious sidebands from an imperfect Serrodyne are well clear of the resonance line shape.

Advantageously, the frequency of the shifted first and second light components is varied at a frequency of substantially 10 KHz.

In one embodiment the gyroscope includes a phase sensitive detector for detecting the phase of the light at one or other of said beam detector means and for producing an output for adjusting a voltage on a light intensity varying means so as to vary the relative intensity of light in said first and second directions.

BRIEF DESCRIPTION OF THE DRAWINGS

The present invention will now be more particularly described by way of example only with reference to the accompanying drawings, in which:

FIG. 2 is a graph of the intensity response at the photodetector as either the frequency of the light or the length of the fibre is changed, FIG. 3 illustrates a perfect Serrodyne signal as used for frequency shifting.

FIG. 5 illustrates an imperfect Serrodyne signal,

FIG. 6 illustrates the response of the resonator with sidebands,

DETAILED DESCRIPTION OF THE PRESENTLY PREFERRED EXEMPLARY EMBODIMENTS

Figure 1:
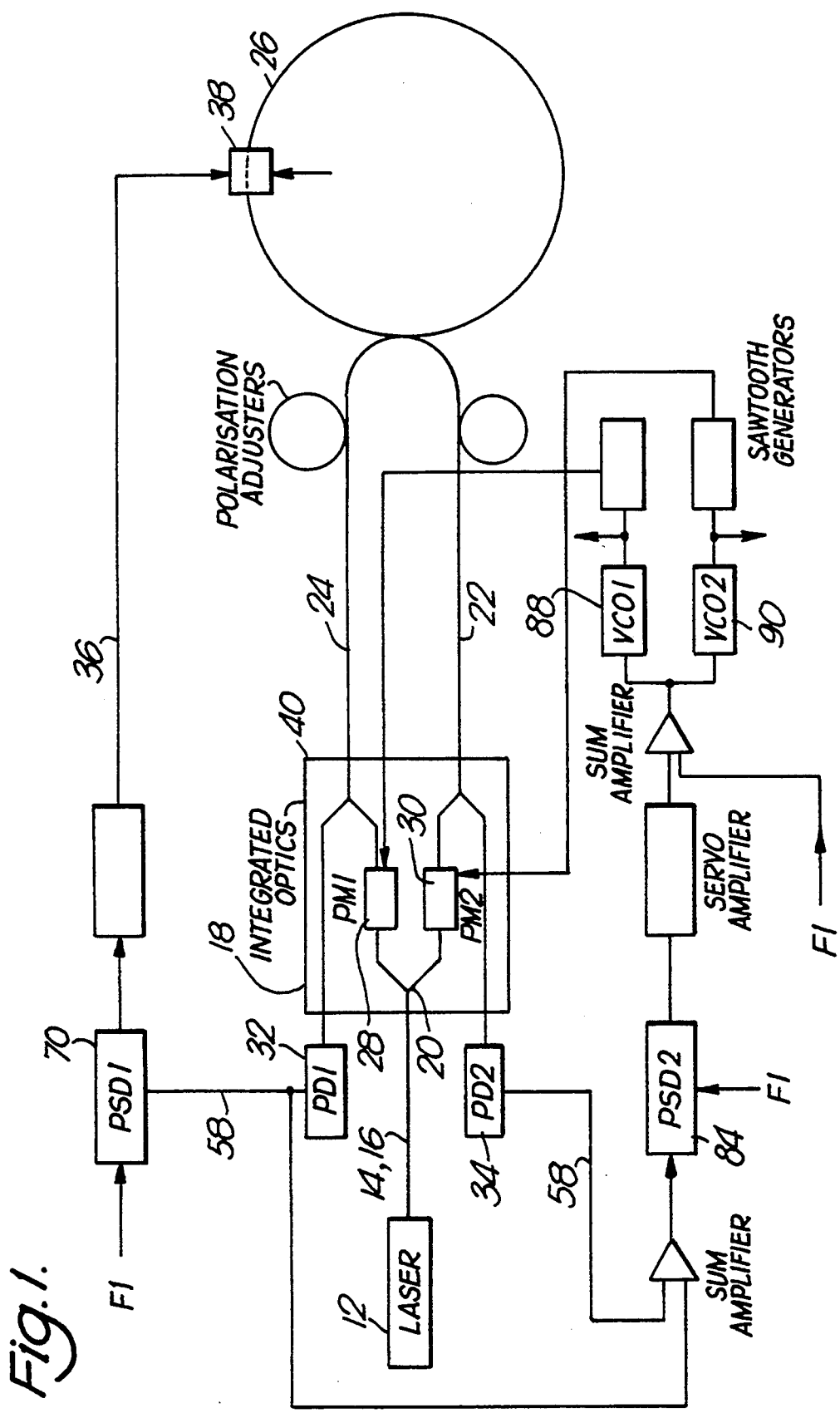
FIG. 1 is a schematic of a ring resonator gyroscope according to the present invention.

Referring now to the drawings in general but particularly to FIG. 1, the ring resonator gyroscope comprises a narrow linewidth laser 12 from which laser light 14 is launched into fibre optics 16 which then enters an integrated optics circuit 18. In the integrated optics circuit 18 the light is split in two by splitting means 20 so as to produce first and second light components or beams 22, 24 to be directed clockwise and anti-clockwise around a ring resonator 26. Phase modulators 28 and 30 frequency shift the first and second light components respectively. Photodetectors 32, 34 act to detect the clockwise and anti-clockwise light components 22, 24 after they have been around the resonator 26. The signal from photodetector 32 is used to drive a path length control loop 36. The function of this is to keep the light locked onto resonance and is achieved by adjusting the length of the fibre of the resonator 26 by means of a piezo 38. Alternatively, wavelength adjusting means shown schematically at 40 may be employed for adjusting the wavelength of the laser.

Figure 4:
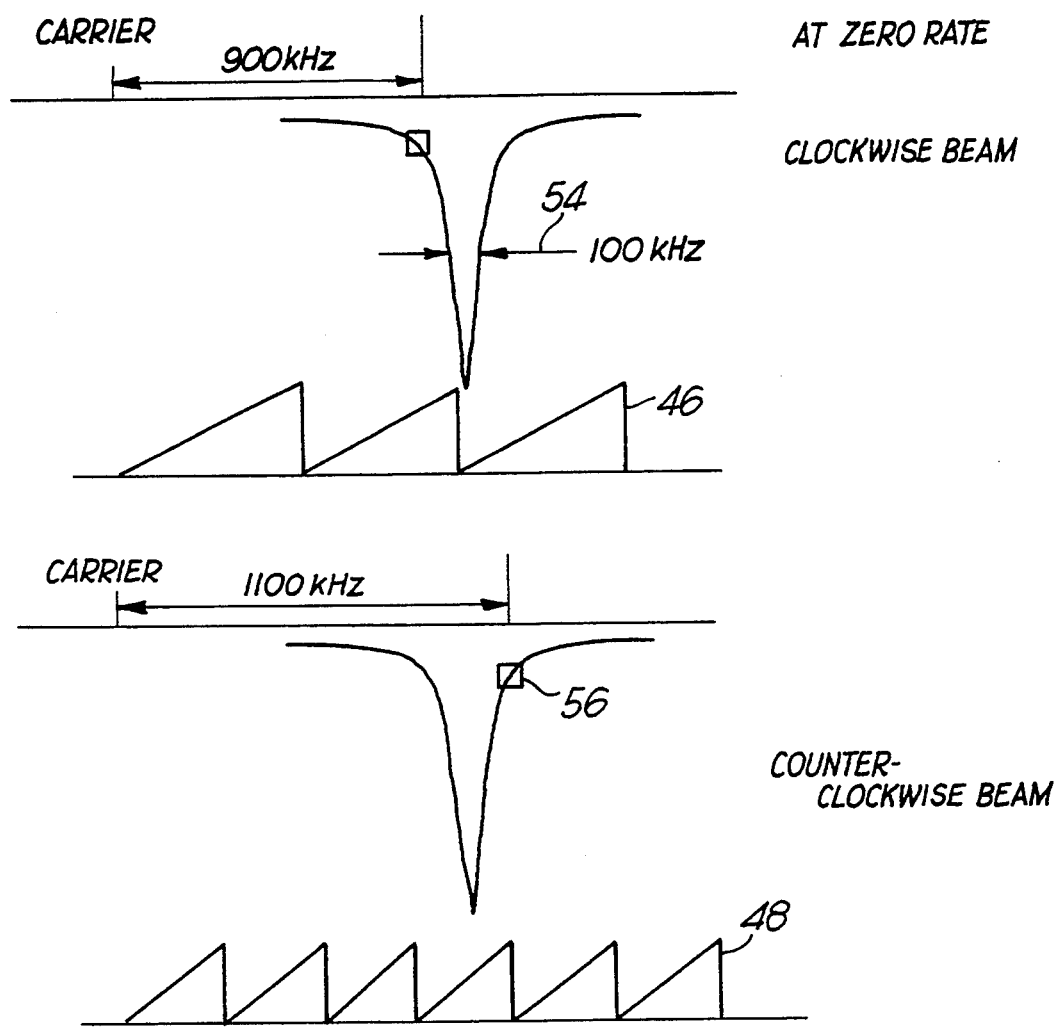
FIG. 4 illustrates the resonance peaks for frequency shifted clockwise and counter-clockwise beams together with associated Serrodyne signals.

FIG. 2 illustrates the intensity response at the photodetector 32 as either the frequency of the light or the length of the fibre is changed. On resonance there is a sharp resonance dip 42 which has the same turning position in the two directions when the gyroscope is at rest. When there is rotation the resonances in the clockwise and the counter-clockwise directions are split by the Sagnac effect. This frequency splitting is proportional to the rotation rate. A frequency shift is introduced by the two phase modulators 28, 30 so that both directions are on resonance at the same time. The frequency shift is produced by a Serrodyne phase modulation, a perfect form of which is shown in FIG. 3. The phase varies from 0 to $2\pi$ in a time t and is then reset to zero instantaneously. The frequency shift induced is then given by 1t Hz. Means (not shown) are provided for varying the duration of the ramp in order to vary the frequency shift. FIG. 4 illustrates the case where a frequency shift of 900 KHz is applied to the clockwise light component and a frequency shaft of 1100 KHz is applied to the counter-clockwise light component. At zero rate this shows that in the clockwise direction the left hand side of the resonance is scanned, while in the counter-clockwise direction [the right hand side] of the resonance is scanned. Also shown in FIG. 4 are the two corresponding Serrodyne waveforms 46, 48. The frequency of the two Serrodyne waveforms is given by:

$$fcw = f_o + f_1 \sin W_m t$$

$$fccw = f_o - f_1 \sin W_m t$$

Where fcw and fccw are the frequencies of the clockwise and counter-clockwise Serrodyne beams. The value of $f_1$ is set to about 100 KHz so that the full linewidth of the resonator is scanned at an angular frequency $W_m$. A typical value for $W_m$ is 10 KHz and this is chosen for convenience of demodulation. In the example shown in FIG. 4, the value of $f_o$ is 1 MHz. This value is chosen so that any spurious sidebands 50 from an imperfect Serrodyne will be well clear of the resonance line shape as shown in FIG. 6 and will not affect the servos. FIG. 5 illustrates an imperfect Serrodyne waveform when the reset takes a finite time and there is a maximum phase not equal to $2\pi$ radians. The effect of this is to generate the sidebands 50 as illustrated in FIG. 6, with the sideband spacing being equal to 1 MHz. FIG. 6 shows that these, sidebands are many linewidths away from line centre, as the fuel half width of the resonance is about 100 KHz, and hence the sidebands with $f_o$ set at 1 MHz are many half widths away from the main resonance and hence spurious signals are avoided.

Figure 7:
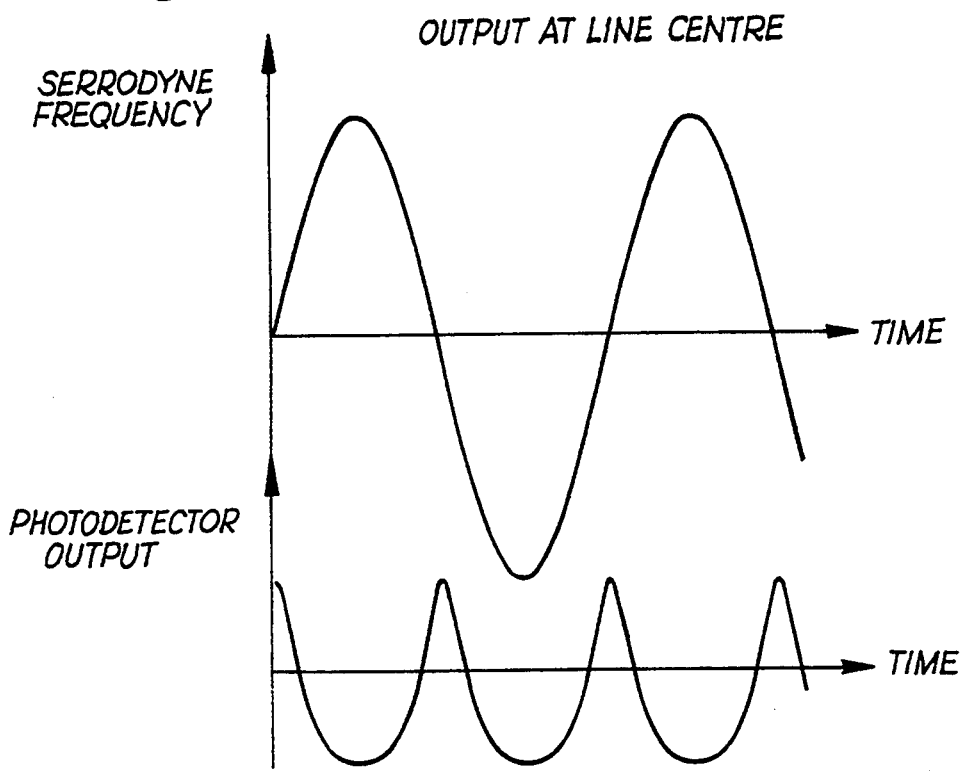
FIG. 7 illustrates the output of the photodetector at line centre.
Figure 8:
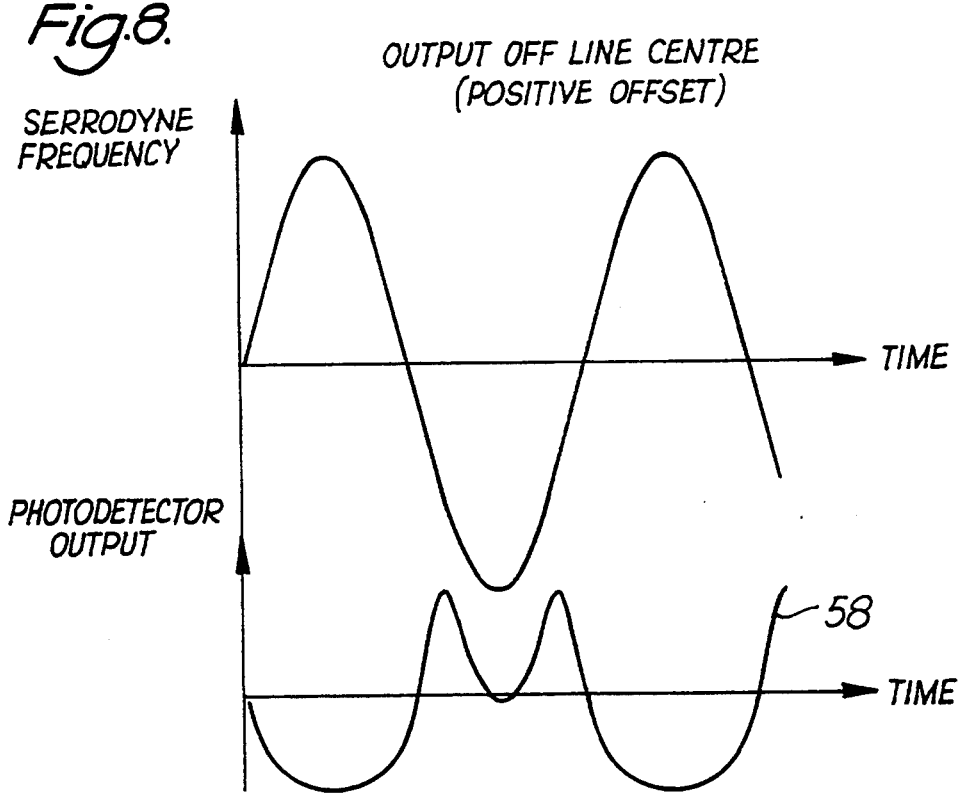
FIG. 8 illustrates the output of the photodetector with positive offset from line centre.
Figure 9:
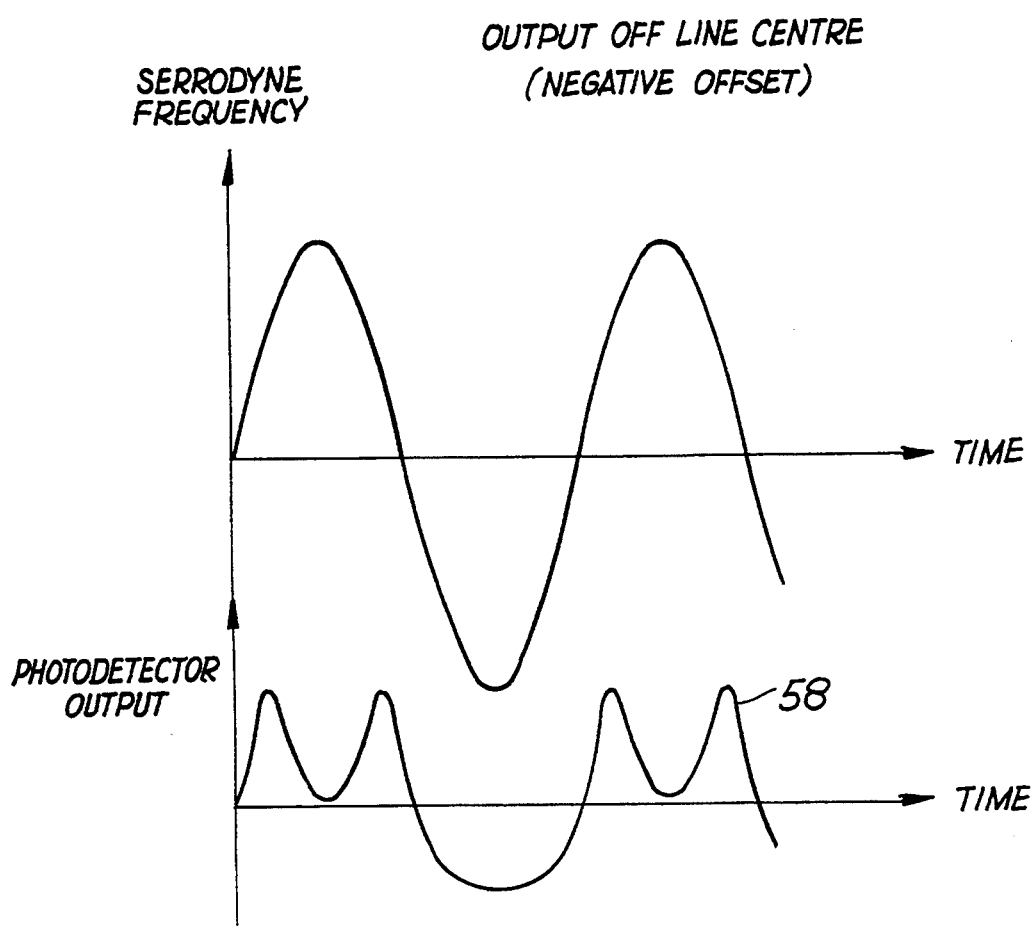
FIG. 9 illustrates the output of the photodetector with negative offset from line centre.

Referring now to FIG. 4, at a later time the clockwise beam will have a frequency shift of 1100 KHz, so the right hand side 56 of the resonance will be sampled and the counter-clockwise beam will have a frequency shift of 900 KHz so the left hand side of the resonance will be sampled. FIG. 7 illustrates the output of the photodetector as a function of time as the Serrodyne frequency fcw goes up and down. On line centre the photodetector output 58 is the frequency doubled version of the input Serrodyne frequency. Off line centre with a positive offset the photodetector output is shown in FIG. 8, where there is a signal of $W_m$ on the photodetector out of phase with the frequency variation, while FIG. 9 illustrates the case with a negative offset when the photodetector has an in-phase signal $W_m$. The signal at $W_m$ on the photodetector can thus act as an error signal to drive a servo 60 to lock to line centre as is well known.

For the resonator gyro two servos are employed. One 60 locks the one direction of light onto resonance by changing the fibre length, or the laser frequency as discussed above and this is called the path length servo. The second servo 62 adjusts the relative frequency of the two Serrodyne modulations to bring both directions into resonance at the same time. This is shown in FIG. 10 which illustrates schematically the electronics required to drive the optics illustrated in FIG. 1.

Figure 10:
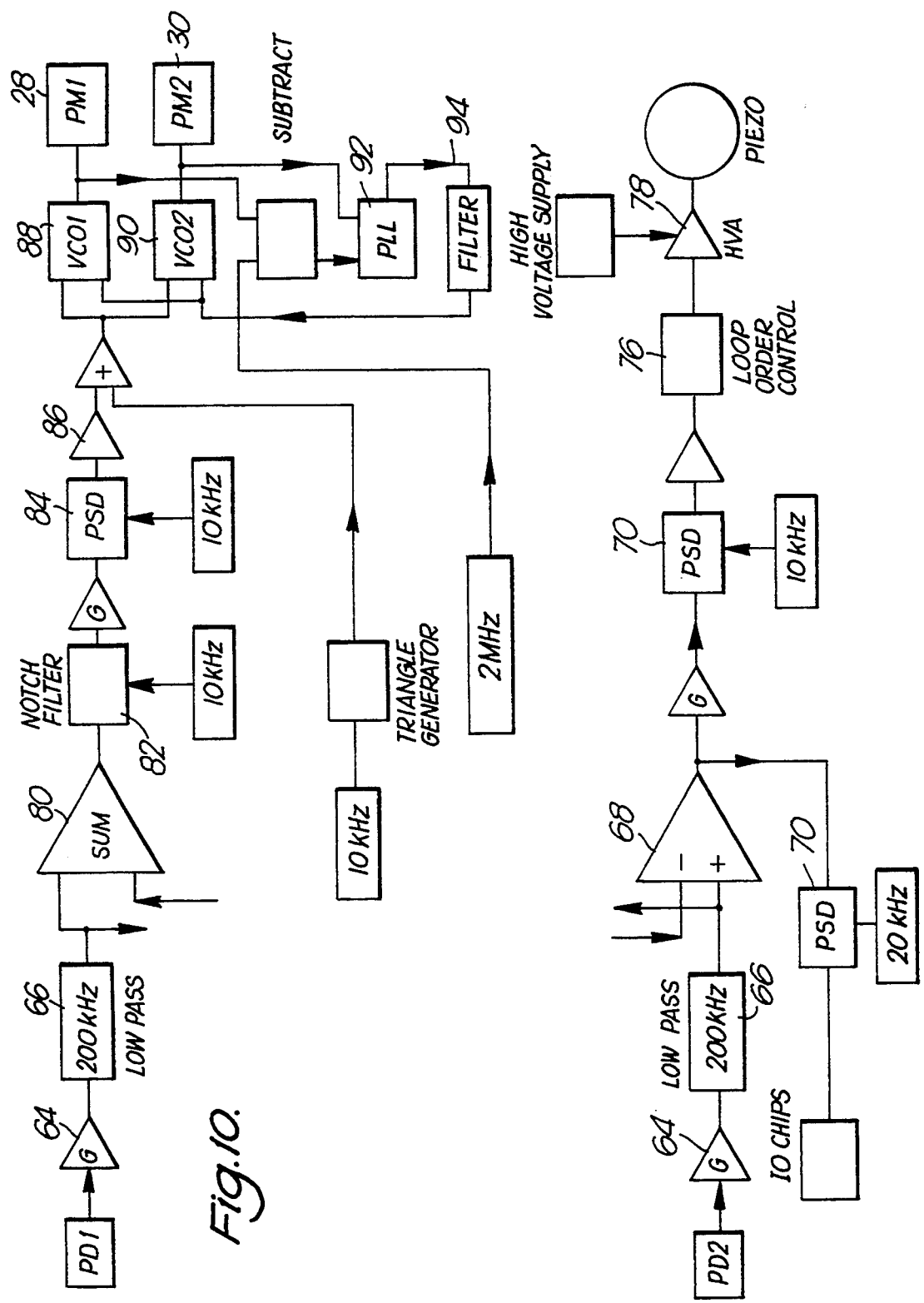
FIG. 10 is a schematic diagram of theee electronics required to drive the optics illustrated in FIG. 1.

Referring now particularly to FIG. 10, the signal from the two photodetectors 32, 34 is amplified at 64 and then passed through a low pass filter 66 to remove any residual signal at the frequency shifting of 1 MHz. A differential stoplifter 68 is used in the path length loop. Demodulation at 20 KHz on the output 70 is used to control a common mode rejection loop. This ensures that the signals at 20 KHz from the two photodetectors are matched and equalises the gains in the two signal channels, so that the difference in signal at 10 KHz is only dependent on the difference in tuning positions between the directions, which is the correct signal to drive the frequency servo. The output of the phase sensitive detector 70 after low pass filtering at 72 is used to adjust a voltage on a coupler 74 on the integrated optics 40 which alters the relative intensity of light in the two directions. The output of the differential amplifier is demodulated also at 10 KHz, after low pass filtering (shown by the loop order control 76) the signal drives a high voltage amplifier (HVA) 78 and this in turn drives the piezo 38 to control the path length so that the mean path is on resonance.

For the frequency loop a sum amplifier 80 is used, and a notch filter 82 operating at 20 KHz, but clocked at 10 KHz, removes the residual 20 KHz signal. The signal at 10 KHz is then demodulated by the phase sensitive detector 84 and after low pass filtering at 86 the signal feeds to the two voltage controlled oscillators 86, 88 controlling phase modulators 28, 30 respectively. The 10 KHz signal is summed into the error signal and this composite signal drives the two voltage controlled oscillators in antiphase. Therefore if the error signal is zero the two voltage controlled oscillators will be running at the same frequency, with an antiphase frequency deviation at 10 KHz.

A sum frequency lock is also applied to the outputs of the two voltage controlled oscillators by substracting the output of the voltage controlled oscillator 88 from 2 MHz and a phase locked loop 92 compares this signal with the output of voltage controlled oscillator 90. This signal 94 is filtered at 915 and fed to the two oscillators acting in phase, so that this error signal alters both frequencies up and down together.

It will be appreciated from the above that there is a sinusoidally varying difference frequency between the light in the two directions going around the resonator 26. This means that any backscatter signal is at this difference frequency which is large compared to the 10 KHz used for demodulation. The servos will therefore not be disrupted by the effects of backscatter so there will be no locking at zero rate and the scale factor of the gyro will be linear.

The same frequency is applied to both phase modulators in the two directions which means that the benefits of common mode rejection can be achieved between the path length loop and the frequency loop. The gyro quality is dependent upon the operation of the frequency loop, so it is very important to insulate this loop from the effects of path length offsets. This scheme should allow a significant path length desensitisation for the frequency loop.

Other schemes where a difference frequency is applied for modulation and demodulation in the two directions, have no common mode rejection so that the frequency loop is exposed to any path length errors. The sum amplifier and common mode rejection circuit in FIG. 10 should allow a factor of 100 in common mode rejection.

If the frequency deviation in the two directions is in phase, then the light would travel around the resonator with the same frequency and thereby be very susceptible to backscatter effects.

What is claimed is:

1. A ring resonator gyroscope comprising:
   a laser for producing laser light at a first frequency,
   light splitting means for splitting said light into first and second light components,
   a ring resonator for receiving said first light component in a first direction therearound and for receiving said second light component in a second direction therearound,
   frequency shifting means for applying a positive frequency shift to said first light component and a negative frequency shift of equal magnitude to said second light component such that both light components are on resonance at the same time,
   resonance locking means for maintaining said first and second light components on resonance,
   beam detecting means for detecting said first and second light components after passing around the resonator, and
   frequency varying means for varying the frequency of the shifted first and second light components at a frequency ($W_m$) in antiphase to each other about a mean reference frequency ($f_o+f_1$ or $f_o-f_1$).

2. A ring resonator gyroscope as claimed in claim 1 in which the frequency varying means is operable to vary the frequency of the shifted first and second light components sinusoidally about said mean reference frequency.

3. A ring resonator gyroscope as claimed in claim 1 in which the same magnitude of frequency shift is applied to the first and second light components thereby to facilitate common mode rejection.

4. A ring resonator gyroscope as claimed in claim 1 including error signal generating means for monitoring the frequency variation of said first or second light components at said beam detecting means and for generating an error signal for driving servos to lock both light components to a line centre.

5. A ring resonator gyroscope as claimed in claim 1 including path length changing means for changing the path length of the ring resonator so as to facilitate locking onto the resonance.

6. A ring resonator gyroscope as claimed in claim 1 including laser frequency varying means for varying the frequency of the laser light so as to facilitate locking onto resonance.

7. A ring resonator gyroscope as claimed in claim 1 in which the frequency of the laser light as produced by the laser is substantially 1 MHz.

8. A ring resonator gyroscope as claimed in claim 1 in which the frequency of the shifted first and second light components is varied at a frequency of substantially 10 KHz.

9. A ring resonator gyroscope as claimed in claim 1 including phase sensitive detector means for detecting the phase of the light at said beam detector means and for producing an output for adjusting a voltage on a light intensity varying means so as to vary the relative intensity of light in said first and second directions.

10. A ring resonator gyroscope as claimed in claim 1, said frequency varying means including at least one voltage-controlled oscillator which generates a signal indicative of a frequency variation of one of said light components about said mean frequency.

11. A ring resonator gyroscope as claimed in claim 1, wherein said frequency varying means includes first and second voltage-controlled oscillators which generate first and second signals indicative of frequency variations of said first and second light components, respectively.

12. A ring resonator gyroscope as claimed in claim 1, wherein said frequency varying means varies the frequency of at least one of the shifted first and second light components according to a serrodyne waveform.

13. /a ring resonator gyroscope as claimed in claim 12, wherein said frequency varying means varies the frequency of the shifted first and second light components according to first and second serrodyne waveforms, respectively, said first and second serrodyne waveforms being in antiphase with respect to one another.

* * * * *